Patented Feb. 25, 1936

2,031,611

UNITED STATES PATENT OFFICE

2,031,611

PROCESS OF MAKING CELLULOSE ESTERS

Carl J. Malm and Charles L. Fletcher, Rochester, N. Y., assignors to Eastman Kodak Company, Rochester, N. Y., a corporation of New York No Drawing. Application April 13, 1931, Serial No. 529,804

4 Claims. (Cl. 260—101)

The present invention relates to a process of making cellulose acetate in which the amount of acetic anhydride and the amount of acetic acid employed are both reduced below that ordinarily used in the esterification of cellulose.

Heretofore processes of making cellulose acetates have been disclosed in which a small amount of acetic anhydride has been employed in the acetylation of the cellulose. However, the amount of acetic acid necessary has been 6, 8 or even 12 times the weight of the cellulose. Also in many cases the catalyst was added in an amount 10% the weight of the cellulose.

Other prior processes of making cellulose acetates have been disclosed in which only a small amount of acetic acid has been added but the amount of acetic anhydride used has been greatly in excess of that theoretically required for the complete acetylation of the cellulose. Regardless of whether the anhydride or acid has been deficient in prior processes the acetyl-containing constituent which was not deficient was used in amount large enough to compensate for the deficiency of the other acetyl-containing liquid. We have found that heretofore either one or both of the acetyl-containing liquids have been employed in amount greater than necessary to produce a cellulose acetate which is fully esterified and which may be hydrolyzed to a cellulose acetate which is acetone-soluble.

One object of our invention is to provide a process in which the waste of acetyl-containing compounds in the other known processes of acetylating cellulose is eliminated. Heretofore it has been believed to be necessary to have a much larger amount of acetic materials present than the amount we have found as essential.

Another object of our invention is to provide a process of preparing cellulose acetate in which the amount of dope at the end of the acetylation is much smaller in proportion to the amount of cellulose acetate present than has heretofore been thought possible. By our present process we are able to produce larger quantities of cellulose acetate from a given volume of mass than has ever been done previously. Because of this small volume relative to the weight of the cellulose acetate, the capacity of the equipment used in the carrying out of the process is increased so that a much larger production of finished product is possible with a given amount of capital. Also a much larger amount of cellulose acetate may be precipitated and washed than is usually the case at present.

Another object of our invention is to provide a less expensive process of producing cellulose acetate than that employed at present. Our process may employ a smaller amount of reagents, a shorter time, cheaper forms of cellulose and less handling than necessary at present, all of which are salient factors of the production costs in the cellulose acetate industry. By economizing on the four factors cited we have been able to reduce the cost of acetate which is a decided contribution to the advantage of both the producer and consumer.

We have found that cellulose may be acetylated in an acetylating bath containing surprisingly small amounts of acetic anhydride and acetic acid and that a cellulose acetate results which exhibits all the properties of a fully esterified cellulose, such as chloroform-solubility, which upon hydrolysis becomes acetone soluble, etc.

We have found that our hydrolyzed cellulose acetate when colloidized from its solutions such as in acetone or ethylene chloride-alcohol gives a transparent colorless product of useful properties.

We have found that the cellulose acetate produced by our process which is in dope form at the end of the reaction may be precipitated with water or methyl alcohol in any manner shown in the prior art and yields a precipitate of a nature which filters and washes more easily than the finely divided precipitate commonly met with in precipitation of cellulose acetate from its acetic acid dopes.

We have found that cellulose may be transformed into fully esterified cellulose acetate by treating the cellulose with acetic acid, acetic anhydride and a catalyst in the proportions of not more than 3 parts of acetic acid and not more than 2.5 parts of acetic anhydride to every part of cellulose employed in the acetylation. We have found that upon completion of the reaction the proportion of reaction liquid to the cellulose acetate contained therein is less than 3:1.

We have found that the esterification of cellulose in which comparatively small quantities of solvent are employed, as in the present process, can be accomplished at a rather high esterification temperature due probably to the fact that only small quantities of catalyst and acetic anhydride are present, so that degradation and acetolysis of the reaction product is found to be minimized at the temperature used.

To illustrate our invention the following example is given:

A mixture of

| | Pounds |
|---|---|
| Cotton linters | 100 |
| Acetic acid (99.5%) | 300 |
| Acetic anhydride (85%) | 20 |
| Sulfuric acid (95%) | 1 | was kept at a temperature of 100° F. for about 3 hours. 200 lbs. of acetic anhyride (85%) was then added and the temperature was allowed to rise to a temperature of 120–150° F., at which temperature it was maintained until a clear homogeneous dope was obtained.

The reaction mass comprised a solution of about 175 lbs. of cellulose acetate in 445 lbs. of solvent or in other words the ratio of solvent to solid is less than 2.6 to 1. A mixture of 40 lbs. of 50% acetic acid and 3 lbs. of 95% sulfuric acid was added to the mass and hydrolysis was carried out in the usual manner to attain acetone-solubility. If desired, instead of hydrolyzing the reaction mass, the cellulose acetate may be precipitated directly therefrom such as by employing water or methyl alcohol. The hydrolysis if desired may be carried to the desired solubility as is ordinarily the case with cellulose acetate. After hydrolysis, the mass may be precipitated in any known manner such as by means of water or methyl alcohol.

It is advantageous in our acetylation process that an alkali metal salt such as a sodium sulfate, sodium acetate, sodium phosphate or the like be added to the acetylation bath, as the product formed with this salt present appears to be stronger and of higher viscosity in acetone dopes than the product which has not had this addition. Our theory is that the presence of the alkali salt inhibits the degradation of the cellulose at the temperature employed, although this added benefit instead may be for some reason of which we are not aware.

As previously stated, our process may make use of various forms of cheap cellulosic material which cannot be acetylated by many acetylation processes known at the present time. Such cellulose-containing materials as bagasse, wood pulps, esparto and grass products, corn stalks, etc. may be employed as the cellulosic materials in our process. It is preferable that the cellulose used be free of lignin and other encrusting materials which will interfere with the acetylation of the cellulose.

For example, with bagasse as the starting material, we may proceed as follows:

To 100 lbs. of oven dried bagasse is added 300 lbs. of acetic acid (99.5%) 20 lbs. of acetic anhydride (85%) and 1 lb. of sulphuric acid (95%). This mass is then kept at a temperature of 100° F. for about 3 hours. 200 lbs. of acetic anhydride (85%) and .05 lbs. of sodium sulfate is then added and the temperature is allowed to rise to a temperature of 120–150° F. at which temperature it may be maintained until a clear homogeneous dope is obtained. Obviously, if it is desired to add the sodium sulfate to the pretreatment bath instead of at the point of adding the bulk of acetic anhydride this may be done and may even be preferred as the cellulose is thus protected from degradation by the sulfuric acid in the pretreatment. Obviously, if the buffering action of the alkali metal salt is desired to be increased, it may be added in larger proportions to the reaction bath. For instance, 0.1 lb. of sodium sulfate would obviously exert a more powerful inhibitory action than the proportion specified in the example.

The only requisite of our process is that enough acetyl groups are present to fully esterify the cellulose, if it is desired to produce a completely esterified cellulose acetate. If only partial acetylation of the cellulose is desired obviously less acetyl groups will be necessary than for full acetylation. It is preferred, however, that there be sufficient acetyl groups present to completely esterify the cellulose and also provide a small amount of solvent, as shown for instance in the example, as the reaction mass resulting when a negligible amount of solvent is present is not as easily refined. The time for the acetylation reaction will vary with varied materials and conditions although we have found that 3 to 5 hours, and usually about 4 hours, is sufficient.

Other acetylation catalysts, which are now commonly known in the prior art, may be used instead of sulfuric acid in the acetylation, but sulfuric acid is preferable for economic reasons. With the use of technical reagents the catalytic material may be present as an impurity and the addition of a catalyst may be unnecessary. Even in that case it is preferred, however, that additional catalyst be added to assure the presence of the proper amount of catalyst in the reaction bath.

Part of the acetic acid may in some cases be replaced by other materials which possess the function of dissolving the cellulose acetate produced, such as ethylene chloride, chloracetic acid, as disclosed in Clarke and Malm application #179,177, filed March 28, 1927, now Patent No. 1,880,808, Oct. 4, 1932, or alkoxy acetic acid as disclosed in Clarke and Malm application 520,150 filed March 4, 1931. It is preferred in that case that unsubstituted acetyl groups be present in amount sufficient to fully esterify the cellulose.

Various modifications such as made possible by the varying of technical details will obviously occur to those skilled in the art.

We claim as our invention:

1. The process of acetylating cellulose, which comprises treating one part of cellulose with a mixture of not more than three parts each of acetic anhydride and acetic acid in the presence of approximately .01 part of sulphuric acid until the reaction mass becomes homogeneous.

2. The process of acetylating cellulose which comprises treating one part of cellulose with a mixture of approximately 2.5 parts of acetic anhydride and approximately 3 parts of acetic acid in the presence of approximately .01 part of sulphuric acid until the reaction mass becomes homogeneous.

3. The process of acetylating cellulose, which comprises treating one part of cellulose with a mixture of not more than three parts each of acetic anhydride and acetic acid in the presence of a small amount of alkali metal salt which buffers the acetylation reaction and approximately .01 part of a strong mineral acid acetylation catalyst until the reaction mass becomes homogeneous.

4. The process of acetylating cellulose which comprises pretreating one part of cellulose with a mixture of 3 parts of acetic acid, approximately .01 part of a strong mineral acid acetylation catalyst and approximately .2 parts of acetic anhydride, then adding approximately 2 parts of acetic anhydride to the mass and allowing the reaction to continue until the mass becomes homogeneous.

CARL J. MALM.
CHARLES L. FLETCHER.